Aug. 24, 1948.  O. C. McNAIRN  2,447,588
APPARATUS FOR COUNTING THE REVOLUTIONS OF
A SHAFT AFTER DISCONTINUANCE OF POWER
Filed March 23, 1944
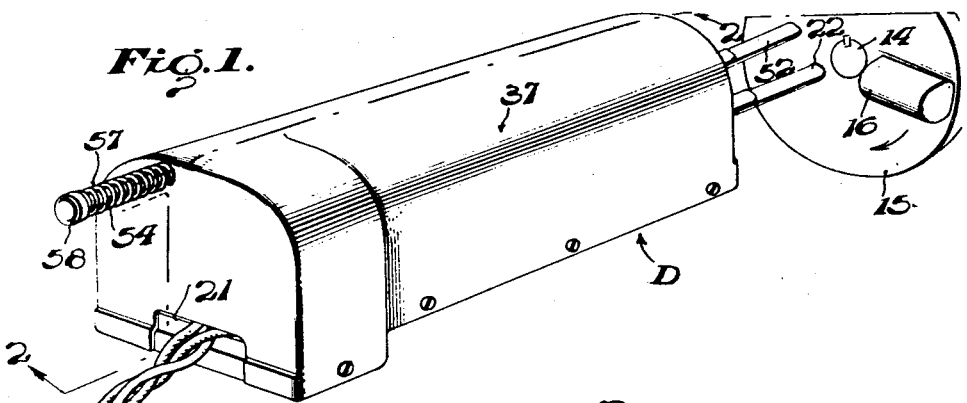
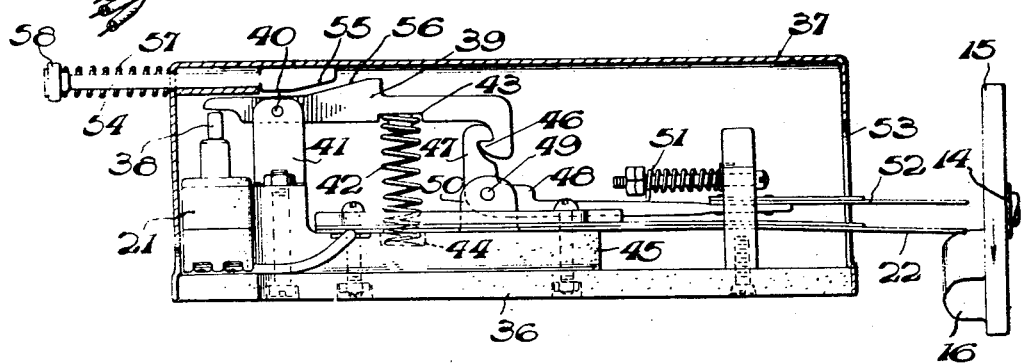
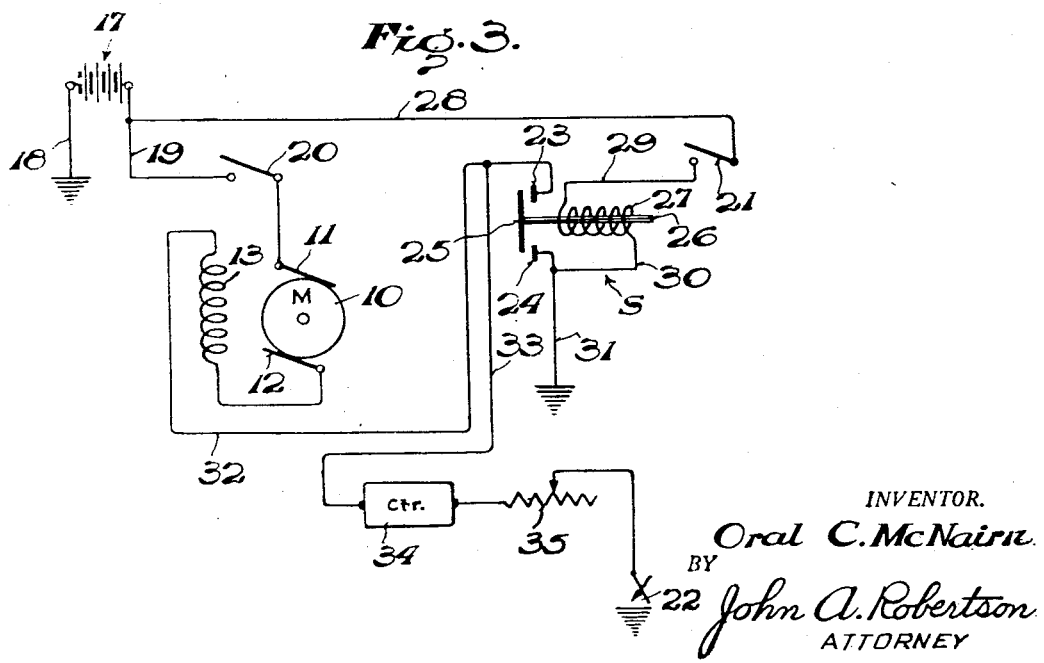
INVENTOR.
Oral C. McNairn
BY John A. Robertson
ATTORNEY Patented Aug. 24, 1948

2,447,588

UNITED STATES PATENT OFFICE 2,447,588

APPARATUS FOR COUNTING THE REVOLUTIONS OF A SHAFT AFTER DISCONTINUANCE OF POWER

Oral C. McNairn, East Orange, N. J., assignor to Bendix Aviation Corporation, Teterboro, N. J., a corporation of Delaware Application March 23, 1944, Serial No. 527,856

7 Claims. (Cl. 73—116)

The present invention relates to apparatus designed for the purpose of counting the revolutions of a shaft after the discontinuance of the delivery of power thereto.

Nearly all the aircraft made in accordance with modern design include retractable landing gears. Such aircraft also include actuator units for raising and lowering the landing gear. In the use of this mechanism under practical conditions, it is highly important that the output shaft of the actuator unit be brought to a standstill immediately after discontinuance of the delivery of power to the motor of the actuator unit. It is evident that if the output shaft should overrun for any appreciable distance, that there is grave danger of damage resulting.

In view of these conditions it becomes important to test these actuator units to ascertain just how many revolutions the output shaft makes after discontinuance of the delivery of power. This invention has in view as an important object, the provision of apparatus which will achieve this result.

In order to test an actuator unit of the character aforesaid it obviously becomes necessary to start the unit in operation, and this invention proposes the use of testing apparatus which is readily adapted for inclusion in the electrical system for running the actuator unit.

Ordinarily these actuator units are grounded and the apparatus provided hereby particularly lends itself to being tied in with such a grounded system. Of course, the ground takes the form of the framework of the unit.

Various other and more detailed objects and advantages of the invention such as arise in carrying out the above noted thoughts in a practical embodiment will in part become apparent and in part be hereinafter stated as the description of the invention proceeds.

The invention, therefore, comprises apparatus for counting the revolutions of an output shaft after the discontinuance of the delivery of power thereto, and particularly involves the adaptation of such apparatus to the electrical system of an actuator unit for a retractable landing gear.

For a full and more complete understanding of the invention, reference may be had to the following description and accompanying drawing, wherein:

Fig. 1 is a perspective view of a device which is included as an essential part of the apparatus and also develops a portion of the actuator unit with which the device is operatively associated;

Fig. 2 is a longitudinal section through the apparatus shown in Fig. 1; and

Fig. 3 is a diagrammatic illustration of the wiring system which characterizes the present invention.

While the present invention is illustrated and described as used in conjunction with the actuator unit of a retractable landing gear, it is evident that the invention is not to be restricted to this particular use. It is susceptible to being employed with any apparatus including a motor and an output shaft wherein it is desirable to count the revolutions of the output shaft upon discontinuance of the delivery of power to the motor.

Referring now to the drawing, wherein like reference characters denote corresponding parts, and first more particularly to Fig. 3, the motor of an actuator unit is therein depicted diagrammatically and referred to in its entirety by the reference character M. It happens that this motor is shown as being a D. C. motor, but this is intended as no limitation on the invention. The motor M is shown as including an armature 10 with which cooperate brushes 11 and 12 and a series field 13.

The only other part of the actuator unit with which this invention is particularly concerned is the output shaft, which is represented at 14 in Fig. 2, and which shaft 14 carries a brake drum 15 having a face provided with a projection in the form of a radial rib or hump 16. At this point it is well to note that the hump 16 is a part of the ground of the unit.

When the actuator unit, including the motor M and output shaft 14, is to be tested to count the revolutions of the shaft 14 after the discontinuance of the delivery of power to the motor M, it is necessary that the motor M be run. Any suitable source of power supply may be employed for this purpose, the battery which is represented at 17 merely being intended as illustrative. One terminal of the battery 17 is grounded to the frame work of the unit, as indicated at 18. From the other terminal of the battery 17, a line 19 extends to the brush 11. This line may also include a main control switch which is represented at 20.

The device which is shown in Figs. 1 and 2 is referred to in its entirety by the reference character D. This device D includes a switch, which is shown diagrammatically at 21 in Fig. 3, and which switch is opened or closed by mechanisms included as a part of the device D, as will be later described. The device D also includes an electrical contact finger 22 that is also represented in the wiring diagram of Fig. 3, and this contact finger is adapted to make or break contact with the ground in the form of the rib 16.

In addition to the device D, the apparatus necessary to carry out the required testing operation includes a solenoid operated switch referred to in its entirety by the reference character S, and depicted diagrammatically in Fig. 3. The solenoid switch S comprises a pair of contacts 23 and 24 which are adapted to be joined by a bridging element 25 carried by a plunger 26 that is under the influence of a solenoid coil 27.

It will be noted that a line 28 extends from the battery 17 to one terminal of the switch 21, while another line 29 extends from the other terminal to the solenoid coil 27. From the solenoid coil 27 another line 30 leads to a ground connection. The contact 24 is connected to this same ground connection which is represented at 31. This ground connection 31 should be a comparatively short length of wire to provide for a small voltage drop thereacross, as will be later pointed out.

A line 32 connects the series field 13 with the contact 23, and branching off from this line 32 is another line 33 that is connected to an electrically operated counter shown at 34. A variable resistor shown at 35 is in series with the counter 34 and is in turn connected in series with the contact finger 22.

It is notable at this point that counters such as depicted diagrammatically at 34 are well known and available on the open market. It is, therefore, deemed unnecessary to here go into a detailed description of the mechanism of such a counter. It suffices to point out that when the circuit of proper voltage through the counter is completed, it will be affected to indicate one revolution.

Referring now more particularly to Fig. 2, the device D is shown as comprising a base in the form of a panel 36 which carries the various mechanisms of the device. The casing shown at 37 may be employed to house the mechanism. The switch 21 is shown as being carried by the panel 36. A plunger 38 controls the position of this switch, which is normally closed, the closed position being depicted in Fig. 2. The plunger 38 is illustrated in its normal upraised position in which it remains due to the construction of the switch. A lever 39 is pivotally mounted at 40 on an upright 41 that is carried by the panel 36.

An expansion spring 42 has one end received in the recess 43 formed in the lever 39, and its other end is fitted in the recess 44 formed in a member 45 carried by the panel 36. The end of the lever 39 is formed as a hook or detent 46, with which cooperates a latch 47 that is formed as one end of a bell crank 48 which is pivotally mounted at 49 on an ear 50 upstanding from the member 45. The other arm of the bell crank 48 is normally affected by a wire spring 51 to maintain the latch 47 in latching position.

This longer arm of the bell crank 48 also carries a spring finger 52 which projects through an opening 53 formed in the casing 37. Under ordinary conditions the spring finger 52 assumes a side-by-side position with respect to the contact finger 22. It will be noted that the contact finger 22 is also included as a part of the device D but does not involve any operating or moving parts.

It is also notable that when the latch 47 is released as by actuation of the spring finger 52, the hook 46 of the lever 39 is freed and that end of the lever will be moved upwardly under the influence of the spring 42. This depresses the plunger 38 to open the switch 21. In order to reset the device, that is to close the switch 21, there is provided a plunger 54 that is operatively mounted on the casing 37. This plunger 54 on its inner end carries a cam 55 which is adapted to cooperate with a complemental cam 56 formed on the lever 39.

An expansion spring 57 engages a head 58 on the free end of the plunger and the casing 37. This expansion spring normally maintains the plunger in its outermost position. However, it is evident that the plunger may be moved inwardly against the influence of the spring 57 to cause the cam 55 to engage the complemental cam 56 and thus depress the lever 39 into a position in which the detent 46 is caught by the latch 47. This closes the switch 21.

The operation of the above described apparatus will now be described. The device D will first be set so as to close the switch 21. The device D is also intended to be manually movable as a unit so that while the fingers 22 and 52 are ordinarily out of engagement with the rib 16, they may be brought into position in which they are hit by the rib 16 when occasion demands. With the switch 21 closed the solenoid switch S will also be closed. The counter 34 and variable resistor 35 will be connected into the circuit, as depicted in Fig. 3, but the grounded connection at the finger 22 will, of course, be open.

The main control switch 20 will now be closed and the motor M of the actuator unit will be started in operation. When the normal speed of operation of the motor M has been attained, the required test may be made by moving the device D so that both the contact finger 22 and the spring finger 52 will be engaged by the rib 16 as the shaft 14 rotates.

On this initial engagement of the contact finger 22 with the ground at 16, the circuit through the counter will be completed, but the voltage drop across the counter is so small that the counter will not be affected. This is due to the fact that the solenoid switch S is, for the purposes of this initial engagement of the contact finger 22, closed and the voltage drop across this switch and through the line 31 to the ground is so small as to be negligible.

At the same time of the initial contact between the finger 22 and the rib 16, the spring finger 52 is also hit by the rib. It is, therefore, moved upwardly against the influence of the spring 51 and the bell crank 48 is actuated to move the latch 47 and free it from the hook 46. The lever 39 is thus released and the spring 42 moves the lever to open the switch 21. As this switch is opened the circuit through the motor M is broken. Thus, the delivery of power to the motor is discontinued.

Upon the next complete revolution of the shaft 14 the rib 16 engages both the contact finger 22 and the spring finger 52. The latter engagement means nothing, because the latch has already been released and the switch 21 is open. However, the engagement with the contact finger 22 completes the circuit through the counter 34, and inasmuch as full line voltage is now effective, this counter is operated to indicate one complete revolution. This operation will be repeated until such time as the shaft 14 comes to rest.

It is evident that the counting position begins with the rib 16 engaging both of the fingers 22 and 52. When the shaft 14 comes to rest any rotation less than a complete revolution may be readily ascertained by the relative position of the radial rib 16 with respect to the fingers 22 and 52.

In order to reset the device for carrying out another test, all that is necessary is to push in the plunger 54. This closes the switch 21. It is evident that the variable resistor 35 may be adjusted so that the required voltage across the counter 34 may be obtained for any particular hook up.

While only one embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. A device for testing a unit having a motor, comprising, an output shaft driven by said motor including an abutment, a switch included in the circuit of said motor and adapted to open or close said circuit, a counter connected into said circuit in parallel with said switch, and a device including a pair of fingers adapted to be engaged by said abutment during rotation of said shaft, one of said fingers being operatively connected to said switch and the other finger being connected in the electrical circuit of said counter to complete said circuit upon engagement by said abutment.

2. A device for testing a unit having a motor, comprising, an output shaft driven by said motor including an abutment, a solenoid operated switch included in the circuit of said motor, a second switch controlling said solenoid operated switch, a counter connected into the circuit of said motor in parallel with said solenoid switch, and a device having a pair of fingers adapted to be engaged by said abutment, one of said fingers being mechanically connected to said second switch and the other finger being adapted to complete the electrical circuit through said counter upon engagement by said abutment.

3. A device for testing a unit having a motor and an output shaft driven by the motor, comprising, a rotatable member driven by said shaft and formed with a striking element, a switch included in the circuit of said motor adapted to open and close said circuit, a counter connected into the circuit of said motor in parallel with said switch, and a device comprising a pair of spring fingers, operative connections between one of said spring fingers and said switch, said operative connections including a latch for maintaining said switch in a predetermined position, said finger being adapted to be engaged by said striking element to release said latch and change the position of said switch, and electrical connections connecting the other of said fingers into the circuit of said counter, whereby engagement of said finger with said striking element completes the circuit through said counter.

4. A device for testing a unit having a motor and an output shaft driven by the motor, comprising, a rotatable member driven by said shaft and formed with a striking element, a solenoid operated switch included in the circuit of said motor, a second switch controlling said solenoid switch, a counter connected into the circuit of said motor in parallel with said solenoid switch, and a device in which said micro switch is included as an element, together with a pair of fingers adapted to be engaged by said striking element, one of said fingers being mechanically connected to said second switch and electrical connections connecting the other of said fingers into the circuit of said counter, whereby engagement of said last mentioned finger with said striking element completes the circuit through said counter.

5. A device for testing a unit having an electric motor, comprising, a ground in circuit with said motor, an output shaft driven by said motor and constituting a part of said ground, a rotating striking element carried by said output shaft, a solenoid operated switch including a solenoid coil, the energization of which controls the position of said switch, said solenoid operated switch being included in the circuit of said motor, a second switch operatively connected to said solenoid coil for controlling the energization thereof, a counter together with a variable resistor connected into the circuit of said motor in parallel with said solenoid switch, and a movable device in which said second switch is included as an element, said device including a pair of fingers adapted to be engaged by said striking element, one of said fingers being mechanically connected to said second switch, and electrical connections connecting the other of said fingers into the circuit of said counter and variable resistor.

6. A device of the character described for testing a unit having an actuating member, comprising, in combination, a casing, a latch mechanism, a first switch mechanism operated by said latch mechanism, said latch mechanism and switch mechanism mounted within said casing, means arranged to actuate said latch mechanism for operation of said first switch mechanism, and means arranged to form a second switch mechanism, said first and second mentioned means having a portion thereof mounted exteriorly of the casing and arranged for successive operation of said first and second mentioned means by said actuating member.

7. A device of the character described for testing a unit having an actuating member, comprising, in combination, a casing, a latch mechanism, a first switch mechanism released by operation of said latch mechanism, said latch mechanism and switch mechanism mounted within said casing, finger means arranged to actuate said latch mechanism for operation of said first switch mechanism, means arranged to form a second switch mechanism, operating means including said finger means mounted exteriorly of the casing for successive operation of said latch and second switch mechanism by said actuating member, and manually operable means for resetting the latch mechanism and the first switch mechanism after the stated operation.

ORAL C. McNAIRN.

REFERENCES CITED

The following references are of record in the file of this patent:

UNITED STATES PATENTS

| Number | Name | Date |
| --- | --- | --- |
| 986,299 | Lindemann et al. | Mar. 7, 1911 |
| 1,607,270 | Smith | Nov. 16, 1926 |

FOREIGN PATENTS

| Number | Country | Date |
| --- | --- | --- |
| 214,127 | Great Britain | Apr. 17, 1924 |

Certificate of Correction

Patent No. 2,447,588.  August 24, 1948.

ORAL C. McNAIRN

It is hereby certified that error appears in the printed specification of the above numbered patent requiring correction as follows:

Column 5, line 73, claim 4, for the word "micro" read *second*;

and that the said Letters Patent should be read with this correction therein that the same may conform to the record of the case in the Patent Office.

Signed and sealed this 11th day of January, A. D. 1949.

[SEAL]

THOMAS F. MURPHY,
*Assistant Commissioner of Patents.*